Figure 1:
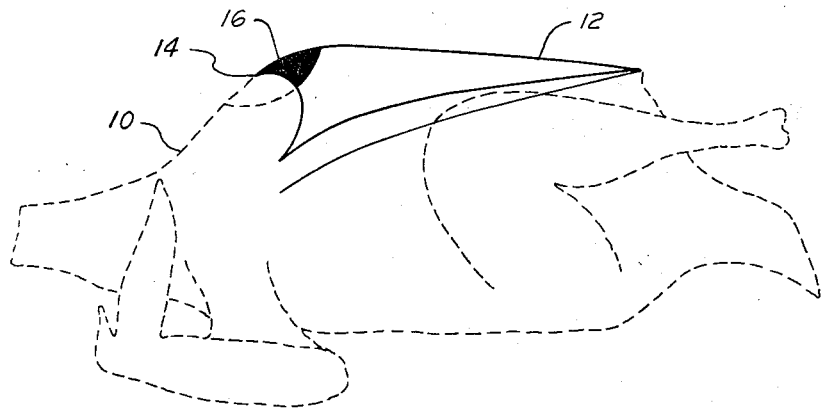

Oct. 1, 1968     C. H. KOONZ ET AL     3,403,683

METHOD OF PREVENTING BREAST BLISTERS IN POULTRY

Filed Feb. 11, 1966

CARL H. KOONZ
ELDON J. STRANDINE
EDWARD EAGLE
        INVENTORS

By *E. McCabe*

ATTORNEY

United States Patent Office 3,403,683
Patented Oct. 1, 1968

3,403,683
METHOD OF PREVENTING BREAST BLISTERS IN POULTRY
Carl H. Koonz, Downers Grove, Eldon J. Strandine, Chicago, and Edward Eagle, Evanston, Ill., assignors to Swift & Company, Chicago, Ill., a corporation of Illinois
Filed Feb. 11, 1966, Ser. No. 526,830
7 Claims. (Cl. 128—303.14)

This invention relates to a method for inhibition of skin blister in poultry and more particularly to a method of preventing breast blisters.

Breast blisters are an unsightly defect in poultry which result in the downgrading of birds with a resultant loss in value. These blisters consist of swellings of the tissues adjacent to the ventral edge of the keel bone (sternal crest). They may vary in size from a few millimeters to more than 2 inches in length. They may be colorless and filled with a clear exudate, or they may be red to blue in color and have a bloody exudate.

When breast blisters are large or discolored enough to render the dressed poultry unsightly in appearance, a government inspector must remove the blister by cutting. These birds with cut skin will then be put in B or C grade class resulting in a monetary loss of 2 to 4 cents per pound depending upon the price schedule for the dressed poultry classes. Breast blisters are more prominent and prevalent on male birds than on female birds, and become more severe as the birds get older and heavier. Chickens and turkeys are both prone to breast blisters. Birds which are raised in cages or batteries have a higher incidence of breast blisters than birds raised in floor pens or on the range. The origin of these blisters has been ascribed to a variety of causes, including bacterial and viral infections, and irritation of the skin and subcutaneous tissues.

Various feeding and management procedures have been tried to eliminate or prevent the blisters. None have proved to be completely successful. Protective shields of solidified cohesive material covering the keel bone area of fowl have been proposed. Difficulty has been encountered in providing a shield which will accommodate the rapid growth of young poultry and also in economically affixing the shield to the fowl in a manner so that the fowl remains protected during the relatively long period of time that poultry are vulnerable to breast blisters.

Accordingly, it is an object of this invention to provide a rapid economical method of inhibiting breast blister in poultry.

Another object of the invention is to provide a method of preventing breast blister in poultry by removal of the anterior tip of the keel bone of young poultry.

A further object of the invention is to provide a method of preventing breast blister in poultry by severing the skin overlying the breast bone of the poultry and cauterizing the anterior tip of the keel bone of the poultry.

Basically the present invention involves elimination of breast blisters in poultry by the removal of the anterior tip of the keel bone of young birds. The tip of the keel bone may be removed by cutting or by cauterizing. Preferably the birds are treated when they are of an age from 1 to 14 days to preclude scar formation.

Figure 2:
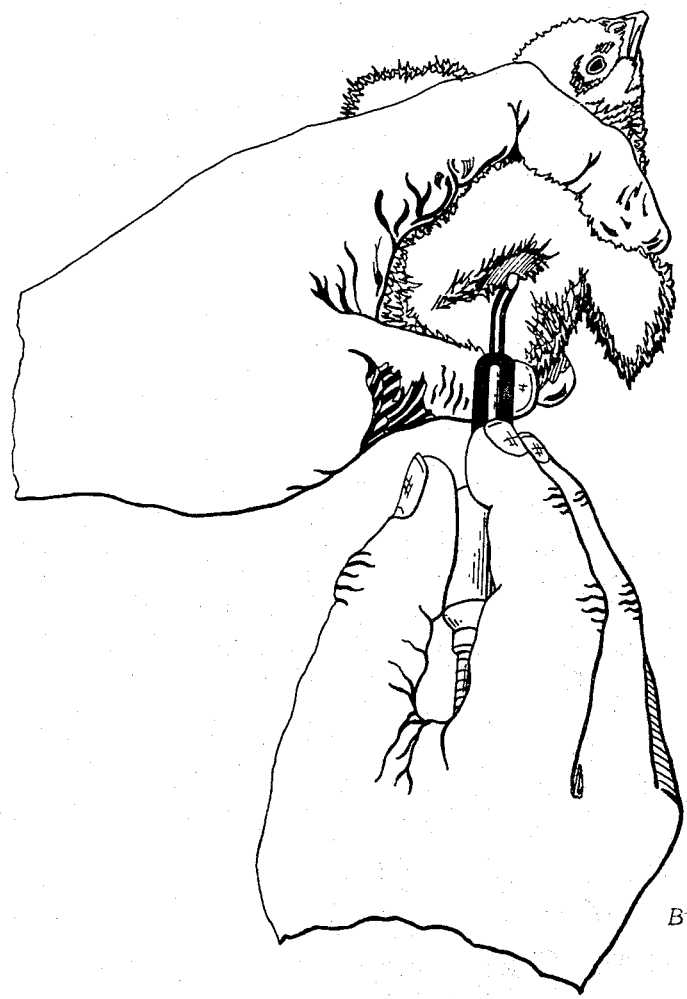

Further objects and advantages of the present invention will become obvious upon reading the following specification in conjunction with the drawings wherein:

FIGURE 1 is a side view of the sternum of a bird with the outline of the carcass shown in dotted lines; and FIGURE 2 is a perspective view showing a procedure for holding the bird, a tool used, and the area treated in one embodiment of the invention.

As shown in FIGURE 1, domestic poultry, such as the bird 10, have a sternal crest or keel bone 12 which lies adjacent to the breast skin of the bird. The skin adjacent to the cranial process 14 of the bird is usually loose and in male birds unfeathered. It is this area of the skin that is most prone to development of skin blisters.

In this invention, the anterior tip of the keel bone, the shaded area designated 16 in FIGURE 1, is removed from the poultry when the birds are young resulting in a blunt tipped keel bone. The length of the keel bone which is removed or cauterized is preferably from 1–2 mm. The removal may take place when the bird is from 1 to 14 days old, but is preferably accomplished when the bird is from 1–3 days old. The older the chicks are at the time of the removal, the more chance there is for scar formation. Also, the removal operation generally takes longer for more developed chicks.

The anterior tip of the keel bone 16 may be removed by any means which does not produce permanent tissue damage which would result in an unattractive mature bird. Cauterization is the preferred method of removal. The skin over the anterior part of the keel bone may be either cut prior to cauterization or penetrated by the cauterization tool.

Any small wire or rod heated to a temperature sufficient to sear the tissue of the bird may be used as a cauterizing tool. Examples are a caponizing loop wire, the heating element of an electric debeaker tool, a wood etching tool, and a soldering tool. In general higher temperatures allow faster penetration of the skin and destruction of the keel bone. An electric caponizing wire results in a minimum of scar tissue formation and is the preferred cauterization tool.

Removal of the tip of the keel bone may also be accomplished by cutting or snipping with a scissors, a knife, or shears or other sharp edged instrument. Crushing of the tip of the keel bone with pliers or another blunt instrument is another usable procedure. However, because of the greater degree of tissue damage, the latter procedure is not as advantageous.

The blunting operation whether by cauterization or by cutting requires only a few seconds per bird. No complicated equipment is required as the birds may advantageously be held manually in one hand and the cauterization or cutting tool manipulated with the other hand as shown in FIGURE 2. In tests involving the removal and blunting of the tip of the keel bone, the mortality rate of the birds has been zero.

*Example I*

The following table illustrates the effectiveness of the invention in preventing breast blisters. In a test involving 60 chicks no breast blisters requiring trimming developed in birds when raised in batteries or in floor pens. The anterior tip of the keel bone of all 60 birds was destroyed by cauterization at age 2 days and the birds were raised in floor pens until four weeks of age when half of the birds were transferred to batteries. A control group which was not cauterized was raised at the same time for comparison. The test birds were dressed at 8 weeks of age and examined for blisters with the following results:

|  | In floor pens, percent | | In batteries, percent | |
|---|---|---|---|---|
|  | Cauterized | Control | Cauterized | Control |
| Large blisters | 0.0 | 3.3 | 0.0 | 36.7 |
| Medium blisters | 0.0 | 6.7 | 0.0 | 26.7 |
| Small blisters [1] | 3.3 | 16.7 | 36.6 | 13.3 |
| No blisters | 96.7 | 73.3 | 63.4 | 23.3 |
| Total | 100.0 | 100.0 | 100.0 | 100.0 |

[1] These blisters were so small they did not require trimming.

Example II

Fifty chicks were cauterized at age 1 day and were raised in floor pens for 8 weeks. These chicks were cauterized using a modified debeaking tool. Small breast blisters which did not require trimming developed on 4% of the birds and 96% of the birds had no breast blisters.

Example III

Twenty-six chicks were cauterized at age 2 days with an electric caponizing wire and were raised in floor pens for eight weeks. None of these birds developed blisters.

Obviously many modifications and variations of the invention as hereinbefore set forth may be made without departing from the spirit and scope thereof, and therefore only such limitations should be imposed as are indicated in the appended claims.

We claim:

1. A method of inhibiting breast blisters in poultry comprising: removing the anterior tip of the ventral edge of the keel bone of live poultry less than about two weeks of age.

2. The method of claim 1 wherein the removal is accomplished by cauterizing the anterior tip of the keel bone.

3. The method of claim 2 wherein the poultry is cauterized at an age from 1 to 3 days by an electric caponizing wire.

4. The method of claim 1 wherein the removal is accomplished by cutting off the anterior tip of the keel bone with a sharp edged cutting instrument.

5. The method of claim 4 wherein the cutting off of the anterior tip of the keel bone is accomplished when the poultry is from 1 to 3 days of age.

6. A method of inhibiting breast blister development in young growing poultry comprising: severing the skin overlying the breast bone of said poultry; and cauterizing the anterior tip of the keel bone of said poultry, whereby to blunt the cranial process of said keel bone.

7. The method of claim 6 wherein the severing and cauterizing steps are performed on birds from 1–3 days old.

References Cited

UNITED STATES PATENTS

| | | | |
|---|---|---|---|
| 2,120,598 | 6/1938 | Beuoy | 128—303.14 XR |
| 3,143,099 | 8/1964 | Poole et al. | 119—143 |

L. W. TRAPP, *Primary Examiner.*